US008145861B1

(12) United States Patent
Manthey et al.

(10) Patent No.: US 8,145,861 B1
(45) Date of Patent: Mar. 27, 2012

(54) MANAGING DATA TRANSFER BETWEEN DIFFERENT TYPES OF TAPE MEDIA WITH ENCRYPTION

(75) Inventors: Jenny F. Manthey, Coatesville, PA (US); William W. Disney, Downingtown, PA (US); Douglas W. Stewart, Birdsboro, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 11/252,022

(22) Filed: Oct. 17, 2005

(51) Int. Cl.
*G06F 12/00* (2006.01)
*G06F 3/06* (2006.01)
*G06F 13/00* (2006.01)
*G06F 13/28* (2006.01)

(52) U.S. Cl. ............ 711/162; 711/4; 711/111; 711/161; 711/E12.001; 711/E12.002

(58) Field of Classification Search .................... 711/111
See application file for complete search history.

(56) References Cited

U.S. PATENT DOCUMENTS

| | | | | |
|---|---|---|---|---|
| 5,485,606 A * | 1/1996 | Midgdey et al. ................... 1/1 |
| 5,819,296 A * | 10/1998 | Anderson et al. .................. 1/1 |
| 6,049,848 A * | 4/2000 | Yates et al. ....................... 711/4 |
| 6,397,229 B1 * | 5/2002 | Menon et al. ................. 707/641 |
| 6,567,811 B1 * | 5/2003 | Edwards et al. .................... 1/1 |
| 6,842,833 B1 * | 1/2005 | Phillips et al. ................ 711/162 |
| 7,010,689 B1 * | 3/2006 | Matyas et al. ................ 713/168 |
| 7,222,133 B1 * | 5/2007 | Raipurkar et al. ............ 707/642 |
| 7,254,672 B1 * | 8/2007 | Murray et al. ................ 711/112 |
| 7,447,714 B1 * | 11/2008 | Mackrory et al. ................... 1/1 |
| 7,801,850 B2 * | 9/2010 | Moore et al. ................. 707/610 |
| 2004/0044830 A1 * | 3/2004 | Gibble et al. ..................... 711/4 |
| 2005/0086428 A1 * | 4/2005 | Taniyama .................... 711/111 |
| 2005/0207235 A1 * | 9/2005 | Blendermann et al. .. 365/189.05 |
| 2005/0268068 A1 * | 12/2005 | Ignatius et al. ............... 711/202 |
| 2006/0080500 A1 * | 4/2006 | Manthey et al. ............. 711/111 |

OTHER PUBLICATIONS

"What is image?" http://www.webopedia.com/TERM/i/image.html, Feb. 28, 2006, pp. 1-3.*
"What is disk image?" http://www.webopedia.com/TERM/D/disk_image.html, Nov. 18, 2003, pp. 1-3.*

* cited by examiner

*Primary Examiner* — Pierre-Michel Bataille
*Assistant Examiner* — Matthew Chrzanowski
(74) *Attorney, Agent, or Firm* — Richard J. Gregson

(57) ABSTRACT

A method for managing data transfer from at least one input tape to an output tape begins by opening the output tape. For each input tape, the input tape is opened and directory information about the opened input tape is gathered. Data is read from the opened input tape, the data is encrypted, the encrypted data is written to the output tape, and the input tape is closed. The directory information for each input tape is written to a directory file on the output tape and the output tape is closed.

40 Claims, 8 Drawing Sheets

400

MANAGING DATA TRANSFER BETWEEN DIFFERENT TYPES OF TAPE MEDIA WITH ENCRYPTION

FIELD OF INVENTION

The present invention relates to managing data transfer between different types of tape media, and more particularly, to using encryption to protect the data contained on the tape media.

BACKGROUND

Tape drives and media for backing-up data are enhanced over time with newer tape drives and media providing various benefits over older ones. As newer tape drives and media become more mature and gain market share, older tape drives and media are often phased out and become unavailable. For example, the sole remaining supplier of the so-called 36-track tape drive has ceased manufacturing such drives and will discontinue support for the drives.

Tape drives such as the 36-track tape are typically supported for as long as the spare parts supply lasts. After that, users of obsolete tape drives having data stored on tapes associated with an obsolete tape drive have no way of accessing that data. FIG. 1 shows a conventional computer system 100 including a computer 102, for example a server, an old tape drive 104, and a new tape drive 106. In the prior art, users who have upgraded to a new tape drive 106 typically keep their old tape drive 104 online so that data written to tapes associated with the old tape drive 104 may be restored if needed. However, this data may become inaccessible when the old tape drive 104 fails and the necessary parts for repair are no longer available. A need therefore exists for a method and system for managing data transfer between different types of tape drives and media.

Recently, there have been published reports of backup and archival tapes containing sensitive data being lost (either in-house, in transit to an off-site storage facility, or at the off-site facility itself). Most of these cases have involved tapes that contain data that is not encrypted and therefore could be potentially read and misused if they were to fall into the wrong hands. With most of the focus of data security in the past few years dealing with networking and the Internet, this has exposed a forgotten area of security when dealing with tape media, especially if tapes are sent off-site. Tape encryption is proposed most often as a solution to this problem.

SUMMARY

A method for managing data transfer from at least one input tape to an output tape begins by opening the output tape. For each input tape, the input tape is opened and directory information about the opened input tape is gathered. Data is read from the opened input tape, the data is encrypted, the encrypted data is written to the output tape, and the input tape is closed. The directory information for each input tape is written to a directory file on the output tape and the output tape is closed.

A system for managing data transfer from at least one input tape to an output tape includes a first tape drive containing the input tape, a second tape drive containing the output tape, an encryption engine for encrypting data, and a tape manager. The tape manager includes reading means for reading data from the input tape on the first tape drive, calling means for calling the encryption engine to encrypt the data from the input tape, and writing means for writing the encrypted data to the output tape on the second tape drive.

A method for managing data transfer of a selected virtual tape volume (VTV) from an input tape to an output tape begins by opening the input tape. A directory file on the input tape is read, and the selected VTV is located on the input tape using the directory file. The output tape is opened and data from the selected VTV is read. A determination is made whether the read data has been encrypted, and the data is decrypted if necessary. The data is written to the output tape and the output tape is closed.

A system for managing data transfer of a selected VTV from an input tape to an output tape includes a first tape drive containing the input tape, a second tape drive containing the output tape, a decryption engine for decrypting data, and a tape manager. The tape manager includes reading means for reading data from the input tape on the first tape drive, calling means for calling the decryption engine to decrypt the data from the input tape, and writing means for writing the decrypted data to the output tape on the second tape drive.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

It is noted that the terms "old tape drive" and "new tape drive" as used herein do not necessarily mean an obsolete drive versus a newer drive. For example, where two newer tape drives are present and a user simply has a preference for one over the other, the old tape drive simply refers to a drive previously used to write data which the user now wants to access using another tape drive (i.e., the new tape drive). Further, the terms "media", "tape(s)", and "cartridge(s)" may be used interchangeably herein to refer to the device on which a tape drive writes data.

Figure 1:
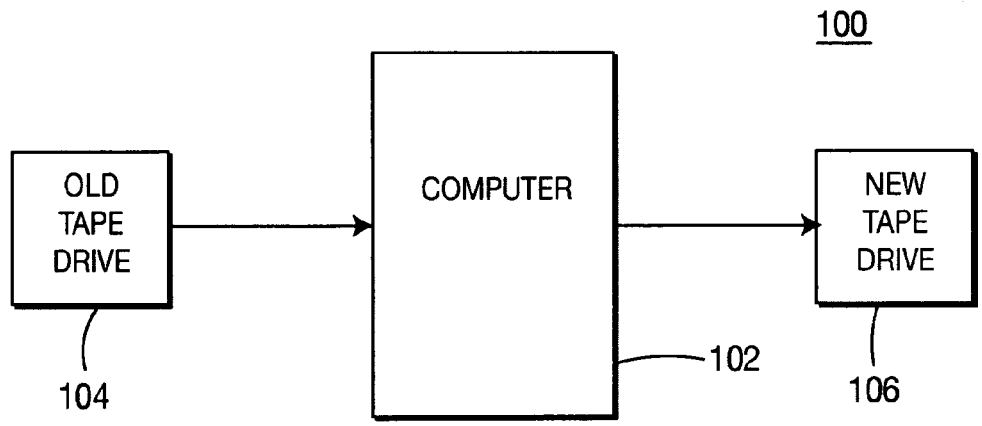
FIG. 1 is a block diagram of a conventional computer system wherein tapes previously written to by a first type of tape drive are not accessible by a second type of tape drive.
Figure 2A:
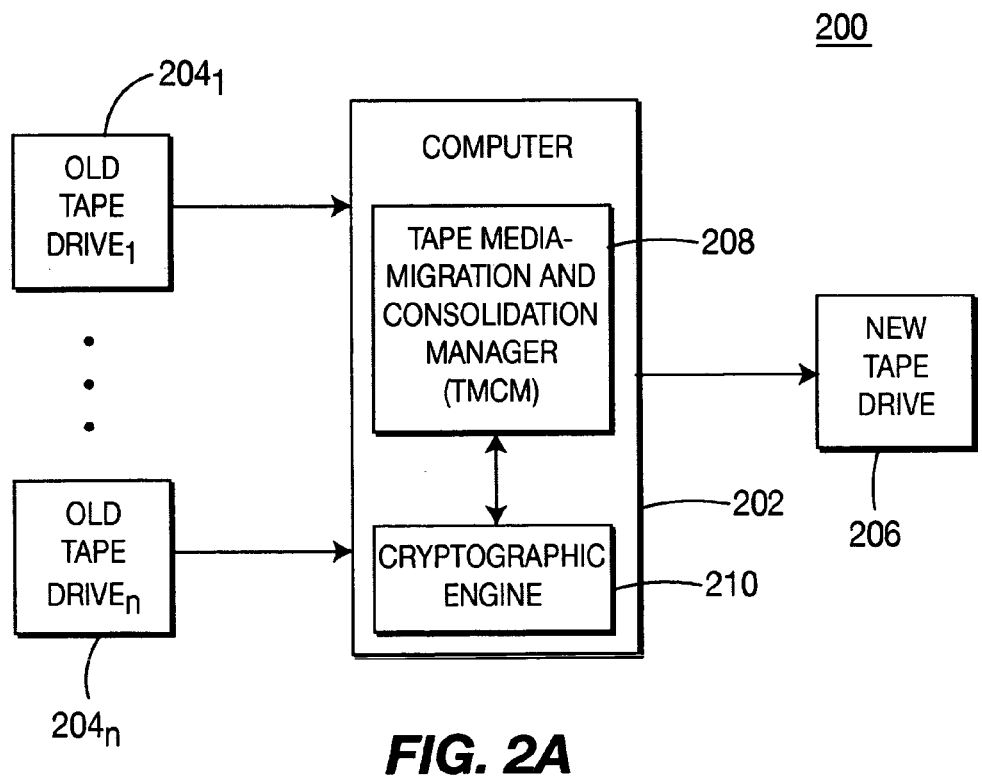
FIG. 2A is a block diagram of a computer system wherein tapes previously written by various types of tape drives are accessible to another tape drive.

FIG. 2A shows a computer system 200 in accordance with the present invention. The system 200 includes a computer 202, one or more old tape drives 204 (i.e., $204_1 \ldots 204_n$), and a new tape drive 206. The computer 202 includes a tape media-migration and consolidation manager (TMCM) 208 and a cryptographic engine 210. It is noted that while the cryptographic engine 210 is shown as being part of the computer 202, the cryptographic engine 210 may be located in a separate device without affecting the operation of the present invention.

The TMCM 208 is configured to enable tapes written by any of the old tape drives 204 to be accessed by the new tape drive 206 in the following way. In a preferred embodiment, the TMCM 208 is configured to enable tapes written by one or more of the old tape drives 204 to be stacked onto a single tape written by the new tape drive 206. The TMCM 208 may also unstack a stacked tape and consolidate previously stacked tapes onto a single tape. The TMCM 208 communicates with the cryptographic engine 210 to encrypt or decrypt data read from the old tape drives 204 before writing to the new tape drive 206.

Figure 2B:
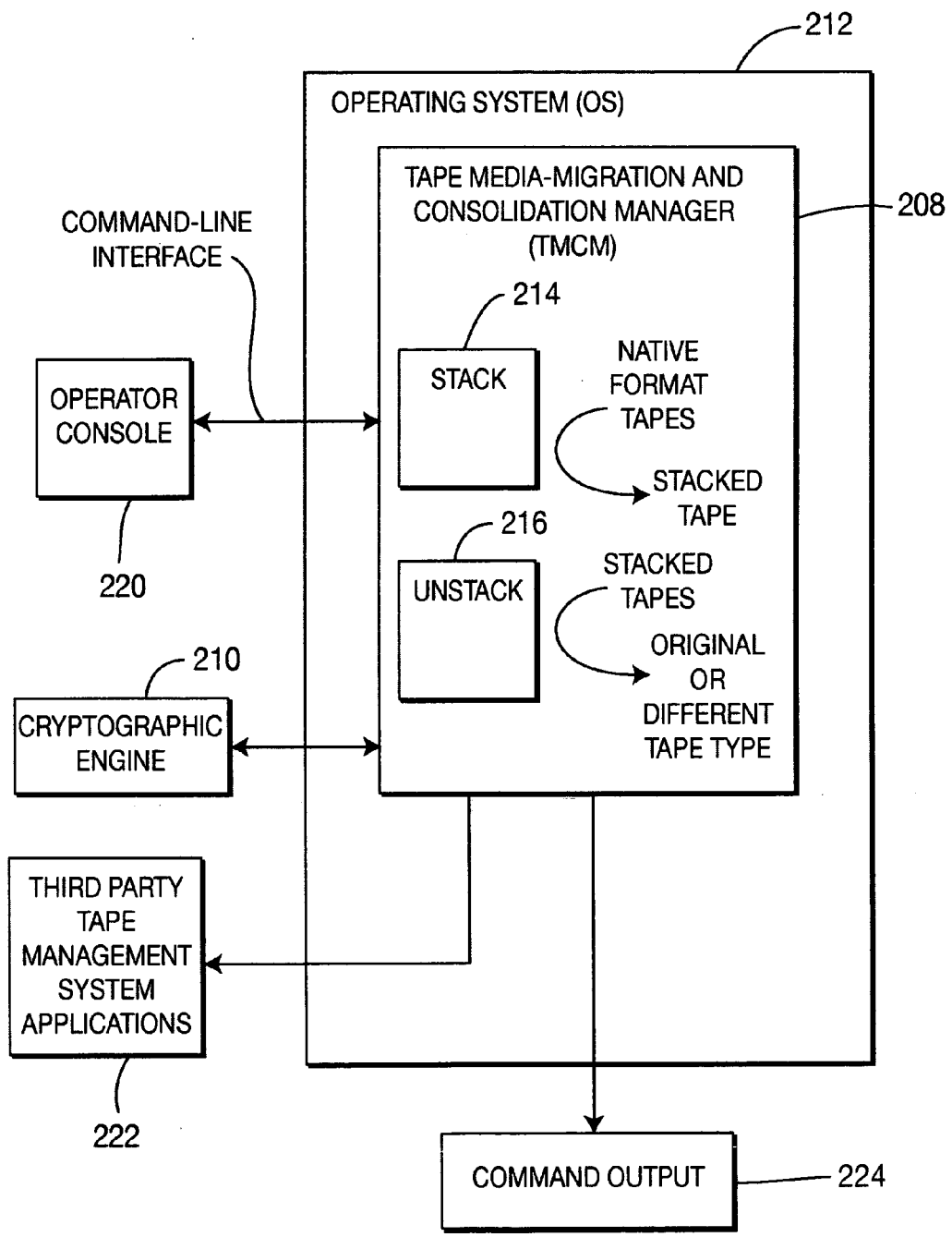
FIG. 2B is a block diagram of a tape media migration and consolidation manager (TMCM) implemented in an operating system (OS)

FIG. 2B shows an implementation of the TMCM 208 as a utility in an operating system (OS) 212. In a preferred embodiment, the OS is a proprietary OS such as, for example, Master Control Program (MCP) by Unisys. The TMCM 208 includes a stacking function 214 for stacking any number of tapes in various native formats onto a single tape. The TMCM 208 also includes an unstacking function 216 for unstacking a previously stacked tape. The TMCM 208 interacts with the cryptographic engine 210 in connection with the stacking function 214 to encrypt data and with the unstacking function 216 to decrypt data.

In a preferred embodiment, the TMCM 208 is controlled and/or monitored by either an operator console 220 or by a third party tape management system 222. It is noted that either of these controllers may direct command outputs to a display screen, a disk file, or printer backup file (not shown). Command output 224 includes the display results and status of a command entered by the user, such as a directory listing, and this output can be sent to a display screen, a disk file, or a printer backup file.

Figure 3:
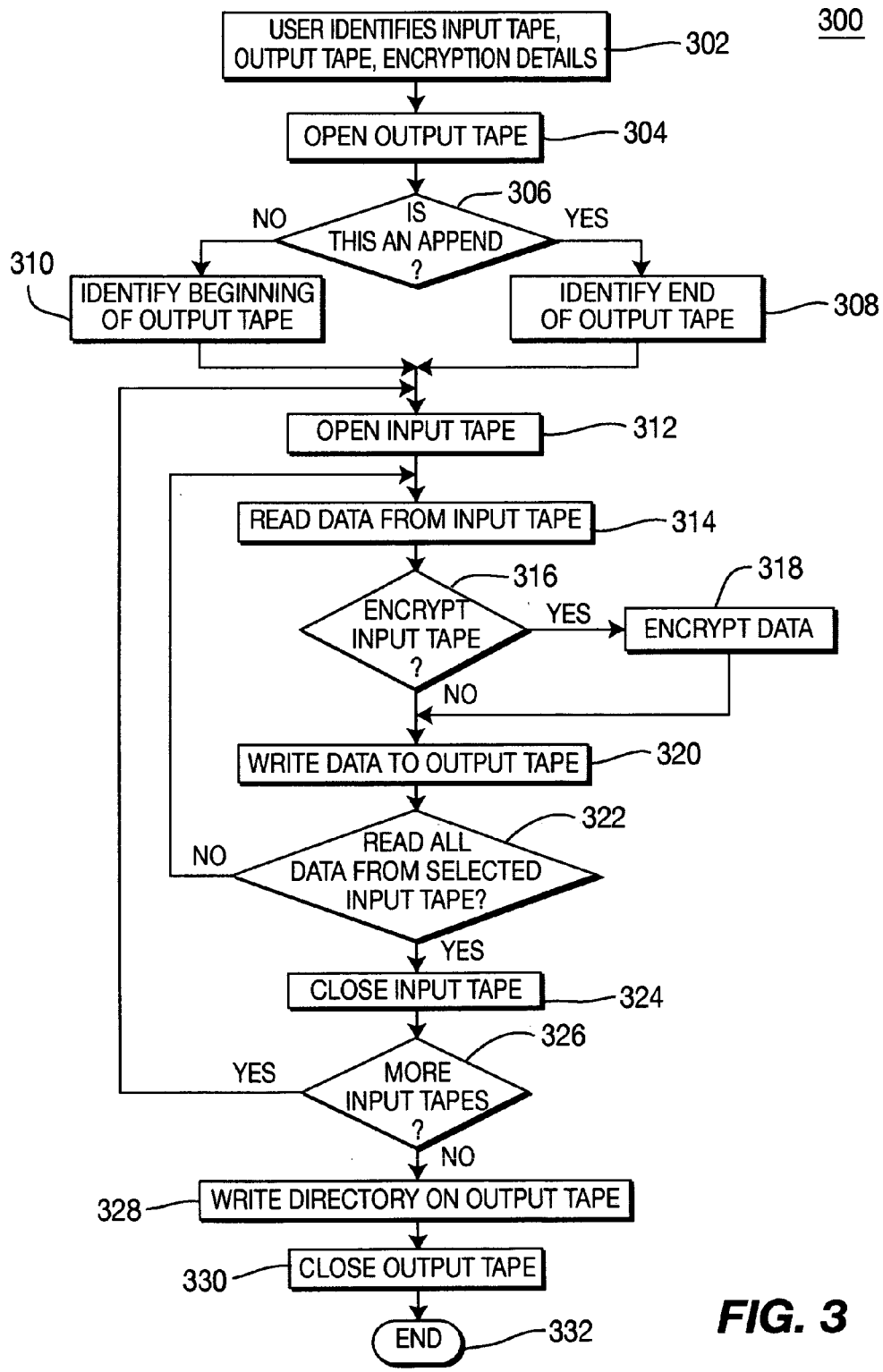
FIG. 3 is a flowchart of a method for creating a stacked tape with an option for encrypting the data on the tape.

FIG. 3 is a flow chart of a method 300 for creating a stacked tape with an option to encrypt some or all of the data on the stacked tape. In this embodiment, data from one or more tapes is input to a computer 202, wherein the TMCM 208 outputs the data and stacks it onto a stacked tape. The tape(s) from which the data is provided are referred to as "input tape(s)" and the tape on which the data is stacked is referred to as an "output tape". The method 300 begins with a user identifying the input tape, the output tape, and the encryption details (step 302). The encryption details can include any information necessary to encrypt the data, such as encryption method, encryption key, passphrase, and the like. The output tape is opened (step 304) and a determination is made whether the current operation is to append to data already written to the output tape (step 306). If it is an append operation, the end of the output tape is identified (step 308). If the operation is not an append, the beginning of the output tape is identified (step 310).

Once the appropriate write point on the output tape is identified (steps 308 or 310), the input tape is opened (step 312) and data is read from the input tape (step 314). A determination is made whether the stack operation includes an encryption option for the current input tape (step 316). It is noted that all of the input tapes to be stacked do not have to be encrypted; the user can selectively encrypt only certain input tapes if desired. If the stack operation includes the encryption option, then the data read from the input tape is encrypted (step 318). It is noted that any encryption method can be used to encrypt the data; the operation of the present invention is not altered based on the type of encryption used. If the data to be written to the output tape would be too large after encryption to fit into one block on the output tape, the data is split into two blocks and each block is encrypted separately and is separately written to the output tape.

If the stack operation does not include the encryption option (step 316) or if the data from the input tape has been encrypted (step 318), the data from the input tape is written to the output tape (step 320). The data is preferably copied in any desired format using ANSI standard labeling conventions. When a tape is stacked, the data is organized on the stacked tape in virtual tape volumes (VTVs) wherein each VTV corresponds to data copied from a particular tape. Each VTV includes a plurality of virtual tape volume segments (VTVSs); additional detail about the stacked tape format is provided in connection with FIG. 7.

After the data is written to the output tape, a determination is made whether all of the data from the selected input tape has been read (step 322). If all of the data has not been read, more data is read from the input tape (step 314) and the method 300 continues as described above. Once the data from the input tape has been written to the output tape, the input tape is closed (step 324).

Next, a determination is made whether there are more input tapes to be stacked (step 326). If there are more input tapes, the next input tape is opened (step 312) and the method 300 continues as described above. If there are no more input tapes (step 326), a directory is written on the output tape (step 328). As known to those skilled in the art, the directory provides organizational information regarding the data stored on the output tape. The directory information is gathered as each input tape is processed, and the information is stored until all input tapes have been written to the stacked tape. The directory is preferably written in any desired format using ANSI standard labeling conventions. Once the directory is written, the output tape is closed (step 330) and the method terminates (step 332).

Figure 4:
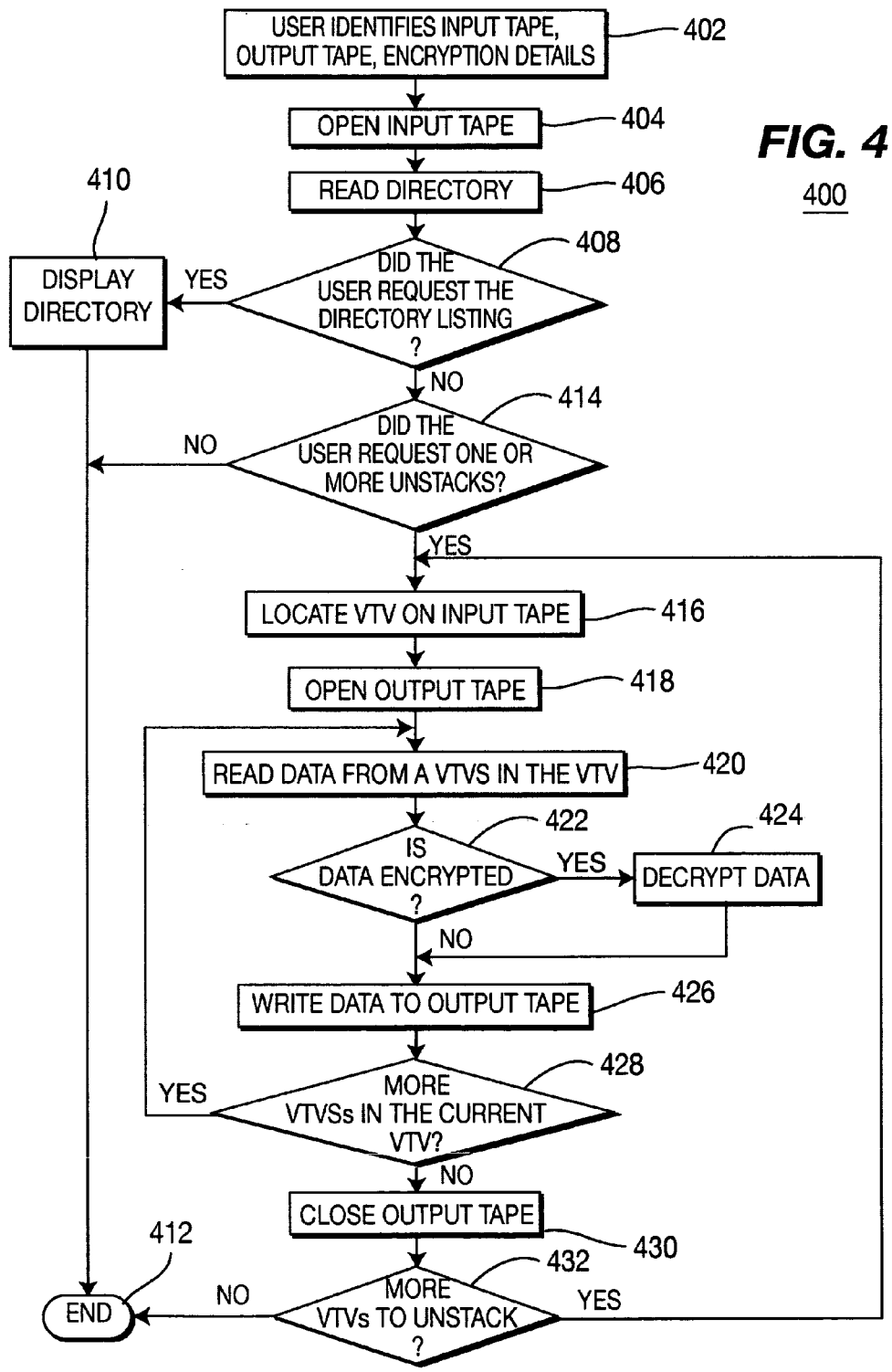
FIG. 4 is a flowchart of a method for unstacking a stacked tape with an option for decrypting the data on the tape.

FIG. 4 is a flow chart of a method 400 for unstacking a previously stacked tape, with an option to decrypt any data that was previously encrypted. In this embodiment, data from one or more previously stacked tapes is input to a computer 202, wherein the TMCM 208 unstacks the data and outputs it to another tape. The previously stacked tapes are referred to as "input tapes".

The method 400 begins with a user identifying the input tape, the output tape, and the encryption details (step 402). The encryption details can include any information necessary to decrypt the data, such as encryption method, encryption key, passphrase, and the like. The input tape is opened (step 404) and the directory of the input tape is read (step 406). The directory is used by the method 400 to locate a particular VTV. If the unstack operation includes the user requesting that a directory listing be displayed (step 408), the directory is displayed (step 410) and the method terminates (step 412). If the unstack operation does not include a directory display (step 408), then a determination is made whether the user wants to unstack one or more tapes (step 414). If the user did not request one or more unstacks, then the method terminates (step 412).

If the user requested one or more unstacks, a VTV is located on the input tape (step 416) and the output tape is opened (step 418). Data is read from a VTVS in the VTV (step 420) and a determination is made whether the data on the VTVS is encrypted (step 422). If the data is encrypted, then the data is decrypted (step 424). If the data read from the input tape was split to fit onto the tape when encrypted, the decrypted block is retained in a memory, the next block is read and decrypted, and the two blocks are concatenated prior to writing to the output tape.

If the data is not encrypted (step 422) or if the data has been decrypted (step 424), the data is then written to the output tape (step 426). A determination is made whether there are more VTVSs in the current VTV (step 428). If there are more VTVSs, then data is read from the next VTVS (step 420) and the method 400 continues as described above.

If there are no more VTVSs in the VTV (i.e., all of the VTVSs have been written to the output tape), the output tape is closed (step 430). Next, a determination is made whether there are more VTVs to unstack (step 432). If there are additional VTVs to unstack, the next VTV is located on the input tape (step 416) and the method 400 continues as described above. If there are no more VTVs to unstack (step 432), then the method terminates (step 412).

It is noted that the stacking and unstacking functions of the present invention are enabled to allow input of heterogeneous media types (e.g., 18-track, 36-track, 9840) into a single stacked tape wherein data copied to the stacked tape is available in a single format on the stacked tape. In a preferred embodiment, when a VTV is retrieved from a stacked tape, any necessary translations between media types to convert the volume into a format consistent with the output tape type will be automatically performed, thereby enabling media translation across various formats.

Figure 5:
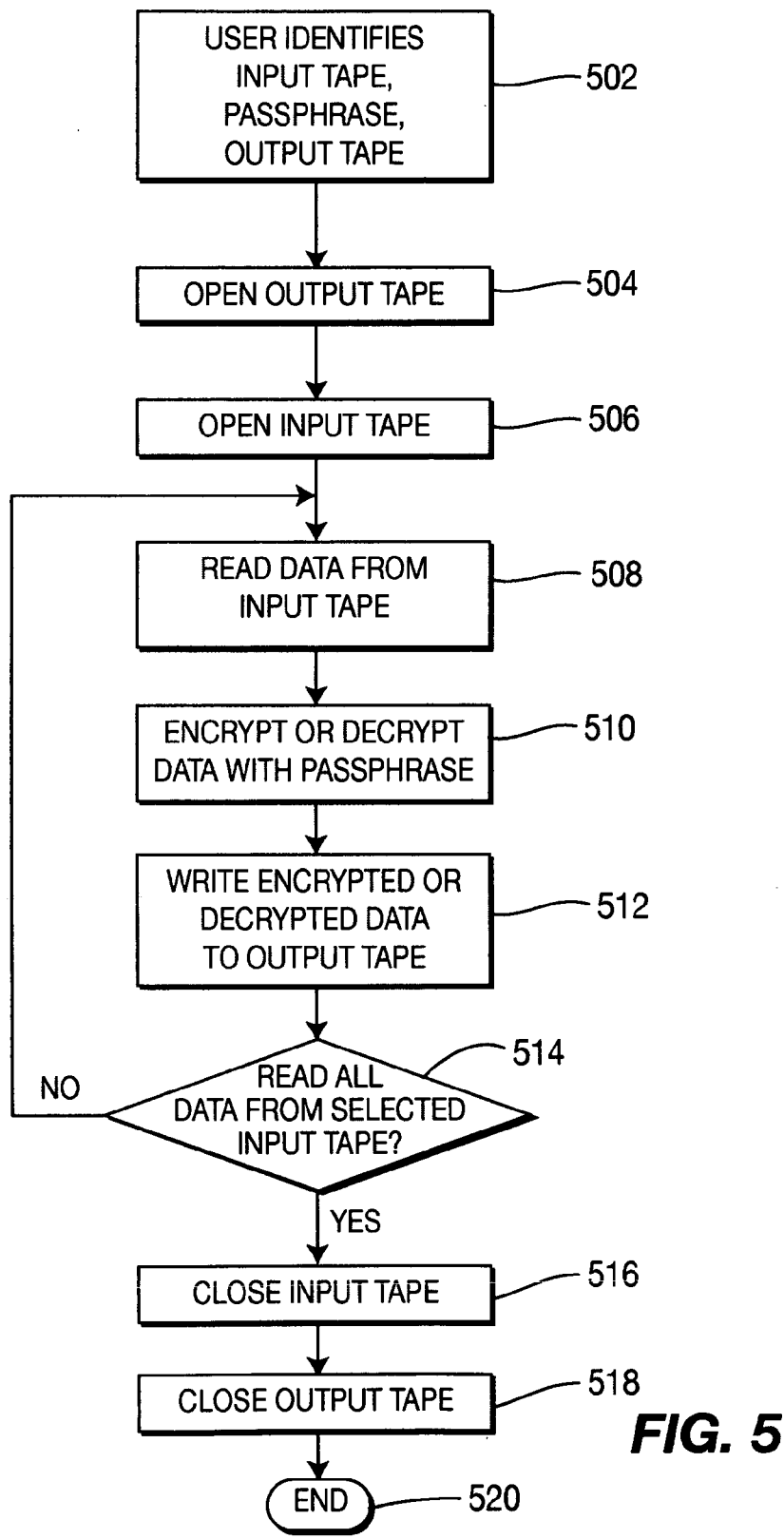
FIG. 5 is a flowchart of a method for encrypting or decrypting a single input tape.

The methods 300 and 400 are used in connection with multiple input tapes. FIG. 5 is a flowchart of a method 500 for encrypting or decrypting a single input tape. The method 500 begins with the user identifying an input tape, a passphrase to encrypt or decrypt the input tape, and an output tape (step 502). While the method 500 is described in terms of using a passphrase to encrypt or decrypt the data, as noted above, any type of encryption or decryption may be used and the user would supply the appropriate encryption/decryption key in step 502.

The specified output tape is opened (step 504) and the specified input tape is opened (step 506). Data is read from the input tape (step 508) and is encrypted or decrypted with the passphrase (step 510). During a decryption operation, the data read from the input tape can include a directory for the tape, which can be used to locate a particular VTV on the tape. During an encryption operation, if the data to be written to the output tape would be too large after encryption to fit into one block on the output tape, the data is split into two blocks and each block is encrypted separately and is separately written to the output tape. During a decryption operation, if the data read from the input tape was split to fit onto the tape when encrypted, the decrypted block is retained in a memory, the next block is read and decrypted, and the two blocks are concatenated prior to writing to the output tape.

The encrypted or decrypted data is then written to the output tape (step 512). A determination is made whether all of the data has been read from the selected input tape (step 514). If all of the data has not been read, then more data is read from the input tape (step 508) and the method 500 continues as described above. If all of the data has been read from the input tape (step 514), then the input tape is closed (step 516), the output tape is closed (step 518), and the method terminates (step 520). If the method 500 includes writing an encrypted stacked tape, a directory is written to the output tape prior to closing the output tape (not shown in FIG. 5).

Figure 6:
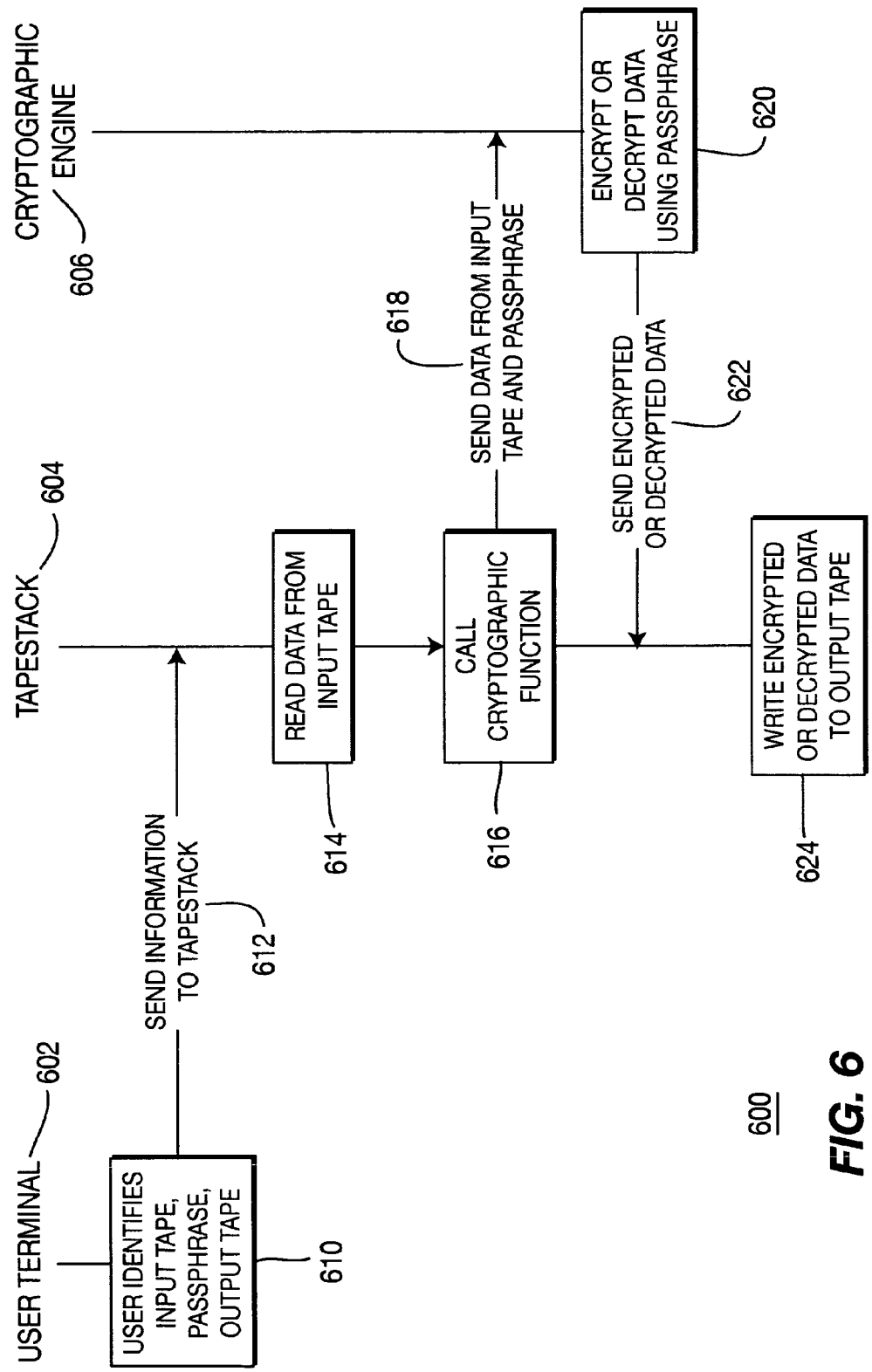
FIG. 6 is a flow diagram of an implementation of the TMCM in the MCP OS.

In a preferred embodiment, the TMCM 208 is implemented as a utility in a proprietary OS. For example, a preferred implementation is to include the TMCM 208 as a utility of Unisys' MCP OS. An example system 600 implementing the TMCM 208 in MCP is shown in FIG. 6.

The system 600 includes a user terminal 602, a TapeStack 604, and a cryptographic engine 606. At the user terminal 602, the user identifies an input tape, a passphrase, and an output tape (step 610) and this information is sent to the TapeStack 604 (step 612). While the system 600 is described in terms of using a passphrase to encrypt or decrypt the data, as noted above, any type of encryption or decryption may be used and the user would supply the appropriate encryption/decryption key. In addition, the user may also select the encryption/decryption method, if multiple methods are supported by the encryption engine.

After receiving this information, the TapeStack 604 reads data from the input tape (step 614). The cryptographic function in the cryptographic engine 606 is called (step 616) by the TapeStack 604 sending the data read from the input tape and the passphrase to the cryptographic engine (step 618). By separating the functions of the cryptographic engine 606 from the functions of the TapeStack 604, the cryptographic function can be made stronger with minimal modification (if any) to the TapeStack 604.

The cryptographic engine 606 encrypts or decrypts the data from the input tape with the supplied passphrase (step 620). In one embodiment, the cryptographic engine 606 encrypts the data using the AES256 or 3DES encryption method and hashes the passphrase using the SHA1 hash method to produce a key to encrypt the data. As is known to one of ordinary skill in the art, any hashing method can be used to hash the passphrase, and any encryption method can be used to encrypt the data. The encrypted or decrypted data is then sent back to the TapeStack 604 (step 622) where the data is written to the output tape (step 624).

Figure 7:
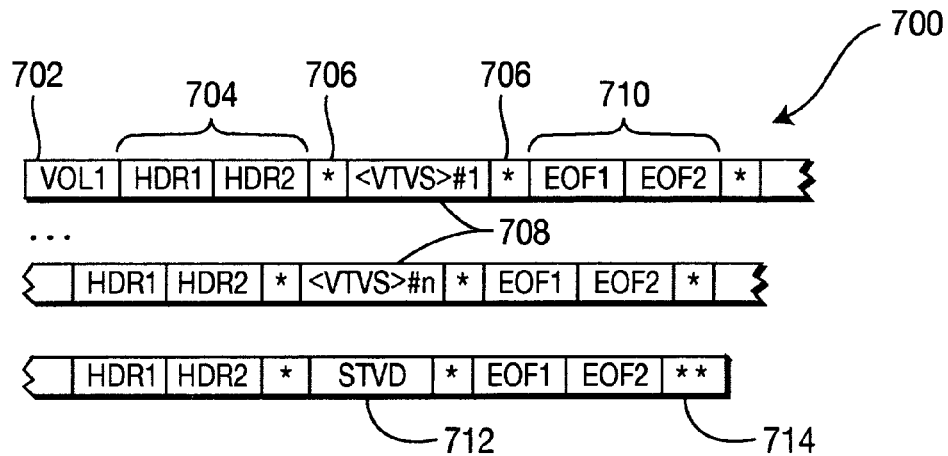
FIG. 7 is a diagram of a stacked tape with data.

FIG. 7 shows a basic layout of a stacked tape 700. The stacked tape 700 layout is used for both an output tape in a stacking operation and an input tape in an unstacking operation. The stacked tape 700 includes a first label record (VOL1) 702, a header label (HDR1 and HDR2) 704, and a tape mark 706 (indicated by the asterisk). The tape mark 706 is a physical mark on the tape to separate different data elements. During a read operation, data is read from a tape in segments delineated by the tape marks.

Data copied from other tapes is presented as a virtual tape volume segment (VTVS) 708. Each VTVS 708 is a direct byte-for-byte copy of a tape file from the original physical tape from which the data was copied. After each VTVS 708, another tape mark 706 is placed, followed by an end of file label (EOF1 and EOF2) 710. It is noted that the labels 702, 704, 710 are preferably standard ANSI69 labels.

A stacked tape volume directory (STVD) 712 is added as the last file on a stacked tape 700. The STVD 712 preferably includes information about the number of VTVs included in the stacked tape 700 and information about each VTV. A double tape mark 714 is provided at the end of the stacked tape 700 to mark the end of the stacked tape 700.

Figure 8:
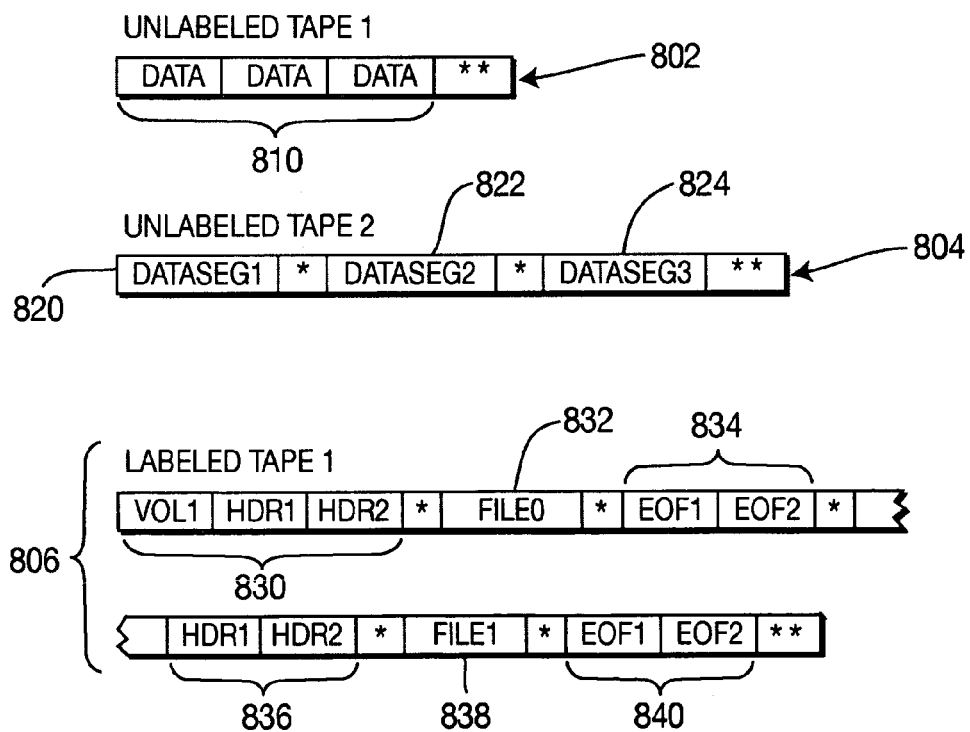
FIG. 8 is a diagram of three input tapes prior to being stacked onto a single output tape.
Figure 9:
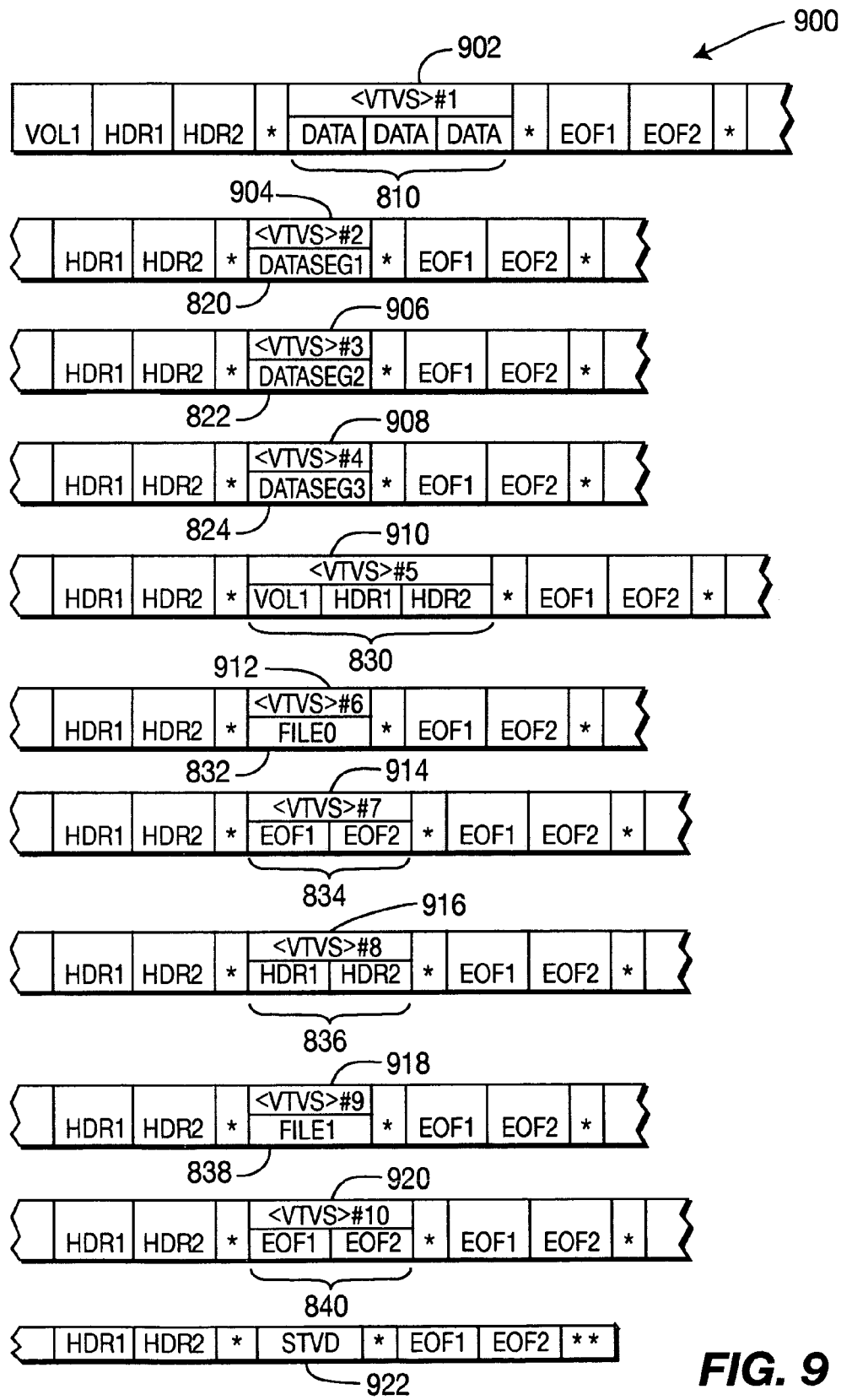
FIG. 9 is a diagram of a stacked output tape wherein data from the three input tapes of FIG. 8 have been copied to the stacked output tape.

FIGS. 8 and 9 show an example of a stacking operation in accordance with a preferred embodiment of the present invention. FIG. 8 shows three input tapes 802, 804, 806 that will be stacked onto a single output tape 900. The first input tape 802 is an unlabeled tape having three data records 810. The second tape 804 is an unlabeled tape having three data segments 820, 822, 824, each separated by a tape mark. The third tape 806 is a labeled tape having a first label record and a header label 830, a first file (File0) 832, first end of file labels 834, second header labels 836, a second file (File1) 838, and second end of file labels 840.

The input tapes 802, 804, 806 are preferably stacked onto an output tape 900 as shown in FIG. 9. The data records 810 on tape 802 may be grouped into a single VTVS 902 because there are no tape marks separating the individual data records. The data segments 820, 822, 824 on tape 804 is preferably written using three VTVSs 904, 906, 908, because there are three different segments on tape 804 separated by tape marks. The data on tape 806 is preferably written using six VTVSs 910, 912, 914, 916, 918, 920, because there are six different segments (830-840) each separated by a tape mark. A STVD 922 is also included on the stacked output tape 900.

By way of example, a sample format for the STVD 922 is shown below. However, as previously noted, the STVD may be in any format.

| Offset | Field Name | Type | Size | Contents |
|---|---|---|---|---|
| 0 | STVD ID | Extended Binary Coded Decimal Interchange Code (EBCDIC) chars | 3 | "USF" |
| 3 | Version | EBCDIC digits | 3 | Version. Initial version is "001". |
| 6 | Valid VTV Count | EBCDIC digits | 3 | Number of valid VTVs in the STVD. |
| The following group of fields are repeated for each VTV: | | | | |
| 0 | VTV Volser | EBCDIC chars | 6 | Virtual tape volume serial number (in EBCDIC). |
| 6 | VTV Segment ID | EBCDIC digits | 6 | ID of the first VTVS of the VTV on the stacked tape. |
| 12 | VTV Segment Count | EBCDIC digits | 6 | Number of (consecutive) VTVSs that make up the VTV. |
| 18 | VTV Block ID | EBCDIC digits | 12 | Block ID of the first VTVS of the VTV on the stacked tape. The block ID corresponds to what would be passed to the tape drive on a position command. |
| 30 | VTV Created Date | EBCDIC chars | 8 | Date the VTV was created on the stacked tape. Format is "YYYYMMDD". |
| 38 | VTV Created Time | EBCDIC chars | 6 | Time that the VW was created on the stacked tape (relative to the VTV Creation Date). Format is "HHMMSS". |
| 44 | VTV Timestamp | Real | 6 | Timestamp in Real format |
| 50 | VTV Size | EBCDIC digits | 6 | Size of VTV |
| 56 | VTV Created Drive | EBCDIC digits | 6 | Drive type of original VTV |
| 62 | VTV Status | EBCDIC chars | 2 | Reserved for status of the VTV. Initially set to valid. "VA" - means the VTV is valid. "IV" - means the VTV has been set to invalid. |
| 64 | Comment | EBCDIC chars | 20 | Comment |
| 84 | Encrypted Volume | EBCDIC digits | 1 | 1 encrypted, 0 not encrypted |
| 85 | Encryption Method | EBCDIC digits | 4 | 2 means '3DES' 1 means 'AES256' 0 not encrypted |
| 89 | Hash Method | EBCDIC digits | 2 | 1 SHA1, 0 not encrypted |

When an encrypted VTV exists, the Comment field will contain an "encrypted" entry instead of a regular comment.

It is noted that the present invention may be implemented in a variety of systems and that the various techniques described herein may be implemented in hardware or software, or a combination of both. Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for managing data transfer from a plurality of input tapes to an output tape, the method comprising the steps of:
   opening the output tape;
   for each input tape:
      opening the input tape;
      reading directory information from the input tape;
      reading data from the input tape;
      determining whether the data read from the input tape is to be encrypted;
      encrypting the data from the input tape if the data is to be encrypted;
      writing the data to the output tape; and
      closing the input tape;
   writing the directory information for each input tape to a single directory file on the output tape; and
   closing the output tape.

2. The method according to claim 1, wherein after the output tape is opened, the method further comprises the steps of:
   determining whether the transfer includes appending onto the end of the output tape; and
   identifying a write starting point on the output tape based on whether the transfer includes appending onto the end of the output tape.

3. The method according to claim 2, wherein if the transfer includes appending onto the end of the output tape, the write starting point is the end of the output tape.

4. The method according to claim 2, wherein if the transfer does not include appending onto the end of the output tape, the write starting point is the beginning of the output tape.

5. The method according to claim 1, wherein the encrypting step includes:
   calling a cryptographic function to encrypt the data.

6. The method according to claim 5, wherein the cryptographic function includes:
   obtaining a passphrase from a user;
   hashing the passphrase to produce a key; and
   encrypting the data with the key.

7. The method according to claim 6, wherein the hashing step includes using a SHA1 hashing method.

8. The method according to claim 6, wherein the encrypting step includes using an AES256 encryption method.

9. The method according to claim 6, wherein the encrypting step includes using a 3DES encryption method.

10. The method according to claim 1, wherein writing data to the output tape includes:
    writing a segment of the data from the input tape as a virtual tape volume segment on the output tape.

11. The method according to claim 10, wherein writing the directory information includes:

writing the directory file to a separate virtual tape volume segment on the output tape.

12. The method according to claim 1, wherein the output tape includes encrypted and non-encrypted data.

13. A system for managing data transfer from a plurality of input tapes to an output tape, comprising:
a plurality of first tape drives each of said plurality of first tape drives containing one of said plurality of input tapes;
a second tape drive containing the output tape;
an encryption engine for encrypting data; and
a tape manager including:
reading means for reading data and directory information from each of the plurality of input tapes on said plurality of first tape drives;
calling means for determining whether to call said encryption engine to encrypt the data from the plurality of input tapes; and
writing means for writing the data and the directory information from each of the plurality of input tapes to the output tape on said second tape drive,
wherein the writing includes writing the directory information for each of the plurality of input tapes to a single directory file on the output tape.

14. The system according to claim 13, further comprising:
a user terminal, whereby a user can identify each of the plurality of input tapes, the output tape, and an encryption method to be used by said encryption engine.

15. The system according to claim 14, wherein
said user terminal includes input means for entering a passphrase; and
said encryption engine is configured to:
has the passphrase to produce a key; and
encrypt the data with the key.

16. The system according to claim 15, wherein said encryption engine is further configured to hash the passphrase using a SHA1 hashing method.

17. The system according to claim 15, wherein said encryption engine is further configured to encrypt the data using an AES256 encryption method.

18. The system according to claim 15, wherein said encryption engine is further configured to encrypt the data using a 3DES encryption method.

19. The system according to claim 13, wherein said tape manager further includes:
determining means for determining whether the transfer includes appending onto the end of the output tape; and
identifying means for identifying a write starting point on the output tape based on whether the transfer includes appending onto the end of the output tape.

20. The system according to claim 19, wherein if the transfer includes appending onto the end of the output tape, the write starting point is the end of the output tape.

21. The system according to claim 19, wherein if the transfer does not include appending onto the end of the output tape, the write starting point is the beginning of the output tape.

22. The system according to claim 13, wherein the output tape includes encrypted and non-encrypted data.

23. A method for managing data transfer of a plurality of selected virtual tape volumes (VTV) from a plurality of input tapes to an output tape, wherein each input tape comprises a selected VTV, the method comprising the steps of:
for each of the plurality of input tapes:
(a) opening the input tape;
(b) reading a directory file on the input tape;
(c) locating the selected VTV on the input tape using the directory file;
(d) opening the output tape;
(e) reading data from the selected VTV;
(f) determining whether the read data has been encrypted;
(g) decrypting the read data if the data has been encrypted; and
(h) writing the data to the output tape;
(i) writing directory information from the directory file for each input tape to a single directory file on the output tape; and
(j) closing the output tape.

24. The method according to claim 23, wherein after step (b), the method further comprises the steps of:
determining whether the directory file is to be displayed; and
displaying the directory file to a user.

25. The method according to claim 23, wherein step (g) includes:
calling a cryptographic function to decrypt the data.

26. The method according to claim 25, wherein the cryptographic function includes:
obtaining a passphrase from a user;
hashing the passphrase to produce a key; and
decrypting the data with the key.

27. The method according to claim 26, wherein the hashing step includes using a SHA1 hashing method.

28. The method according to claim 26, wherein the decrypting step includes using an AES256 encryption method.

29. The method according to claim 26, wherein the decrypting step includes using a 3DES encryption method.

30. The method according to claim 23, wherein a user can select multiple VTVs to transfer and steps (c)-(i) are repeated for each VTV.

31. The method according to claim 23, wherein each of the plurality of input tapes includes encrypted and non-encrypted VTVs.

32. A system for managing data transfer of a plurality of selected virtual tape volumes (VTV) from a plurality of input tapes to an output tape, wherein each input tape comprises a selected VTV, comprising:
a plurality of first tape drives each of said plurality of first tape drives containing one of said plurality of input tapes;
a second tape drive containing the output tape;
a decryption engine for decrypting data; and
a tape manager including:
reading means for reading directory information and the selected VTV from each of the plurality of input tapes on said plurality of first tape drives, the directory information being used to locate the selected VTV;
calling means for determining whether to call said decryption engine to decrypt the selected VTV from the plurality of input tapes; and
writing means for writing the selected VTV and the directory information from each of the plurality of input tapes to the output tape on said second tape drive, wherein the writing includes writing the directory information for each of the plurality of input tapes to a single directory file on the output tape.

33. The system according to claim 32, wherein said reading means is configured to:
read a directory file on each of the plurality of input tapes; and
locate the selected VTV using the directory file.

34. The system according to claim 33, further comprising:
display means for displaying the directory file to a user.

35. The system according to claim 32, further comprising:
a user terminal, whereby a user can identify each of the plurality of input tapes, the output tape, and a decryption method to be used by said decryption engine.

36. The system according to claim 35, wherein
said user terminal includes input means for entering a passphrase; and
said decryption engine is configured to:
hash the passphrase to produce a key; and
decrypt the data with the key.

37. The system according to claim 36, wherein said decryption engine is further configured to has the passphrase using a SHA1 hashing method.

38. The system according to claim 36, wherein said decryption engine is further configured to decrypt the data using an AES256 encryption method.

39. The system according to claim 36, wherein said decryption engine is further configured to decrypt the data using a 3DES encryption method.

40. The system according to claim 32, wherein each of the plurality of input tapes includes encrypted and non-encrypted VTVs.

* * * * *